United States Patent [19]

Hubbard

[11] 4,104,354
[45] Aug. 1, 1978

[54] METHOD FOR ASSEMBLING BY ADHESION WITH SYNTHETIC RESINS

[75] Inventor: Donald Arthur Hubbard, Cambridge, England

[73] Assignee: Pont-A-Mousson S.A., Pont-A-Mousson, France

[21] Appl. No.: 710,943

[22] Filed: Aug. 2, 1976

Related U.S. Application Data

[63] Continuation of Ser. No. 426,733, Dec. 20, 1973, abandoned.

[30] Foreign Application Priority Data

Dec. 29, 1972 [FR] France .................. 72 46885
Oct. 26, 1973 [FR] France .................. 73 38341

[51] Int. Cl.² .......................... B29C 27/00; B29G 7/00
[52] U.S. Cl. ................................ 264/262; 264/265; 264/267
[58] Field of Search ............. 264/263, 265, 261, 262, 264/267, 269, 260, 271, 255, 250; 156/308, 330, 333; 427/407 R, 410; 428/416, 415

[56] References Cited

U.S. PATENT DOCUMENTS

| | | | |
|---|---|---|---|
| 2,180,695 | 11/1939 | Rembert | 285/114 |
| 3,011,909 | 12/1961 | Hart et al. | 427/410 |
| 3,032,460 | 5/1962 | Chipman et al. | 428/416 |
| 3,156,580 | 11/1964 | Howard | 427/322 |
| 3,219,516 | 11/1965 | Cobbledick | 285/291 |
| 3,251,603 | 5/1966 | Cobbledick | 285/291 |

OTHER PUBLICATIONS

Skeist, Handbook of Adhesives, Reinhold, N.Y. (1963) pp. 12.
Skeist et al, Epoxy Resins, Reinhold, N.Y (1964) pp. 21-25.
Phillips et al, Polyurethanes Iliffe Books, London (1964) pp. 58-67.

*Primary Examiner*—Willard E. Hoag
*Attorney, Agent, or Firm*—Sughrue, Rothwell, Mion, Zinn and Macpeak

[57] ABSTRACT

The method comprises applying on the surface of each of the parts a thin layer of a curable first mixture containing a first resin which cures slowly and is slightly exothermic and has a good adherence to said surfaces. A curable second mixture is then introduced in a space defined by the layers of the first mixture in the final position of the two parts. The second mixture contains a second resin which cures rapidly and is sufficiently exothermic to promote the curing of the first resin and normally has after curing a poor adherence to said surfaces but a good adherence to the first resin.

23 Claims, 8 Drawing Figures

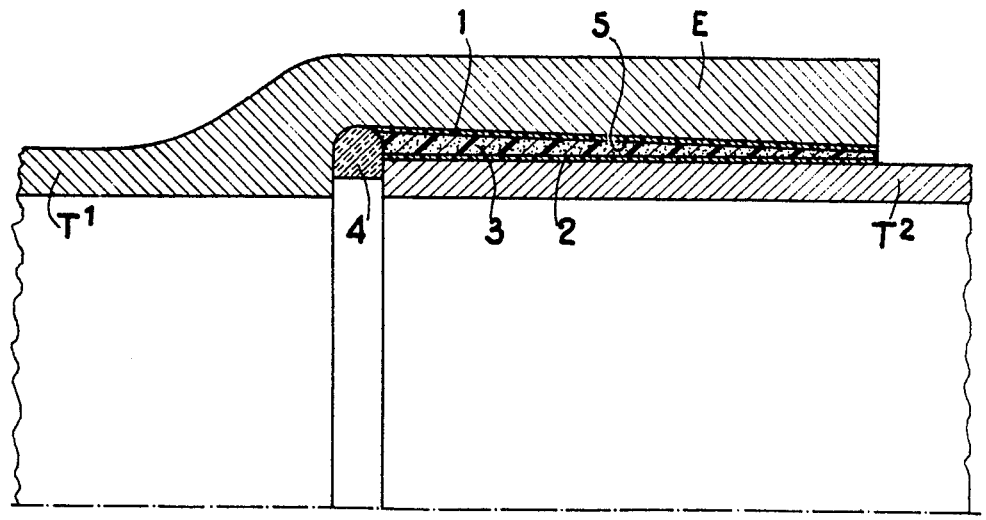
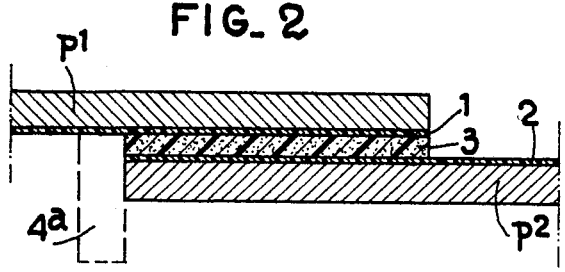

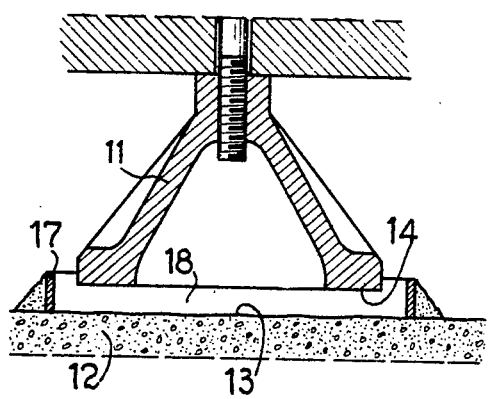
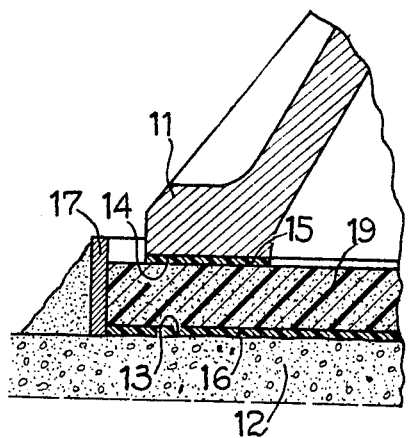
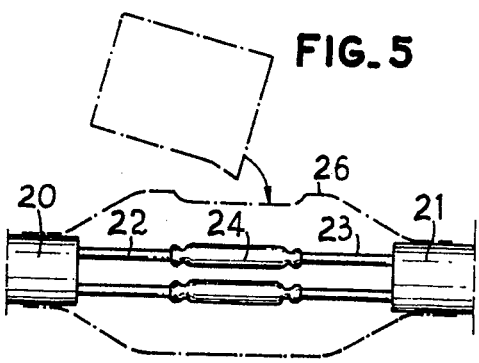
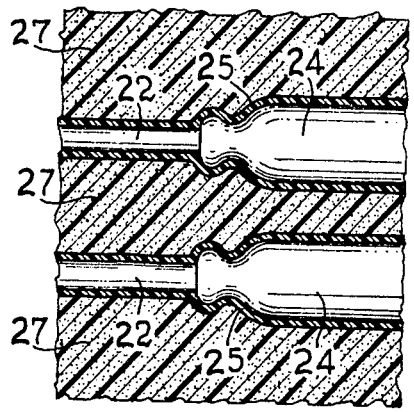
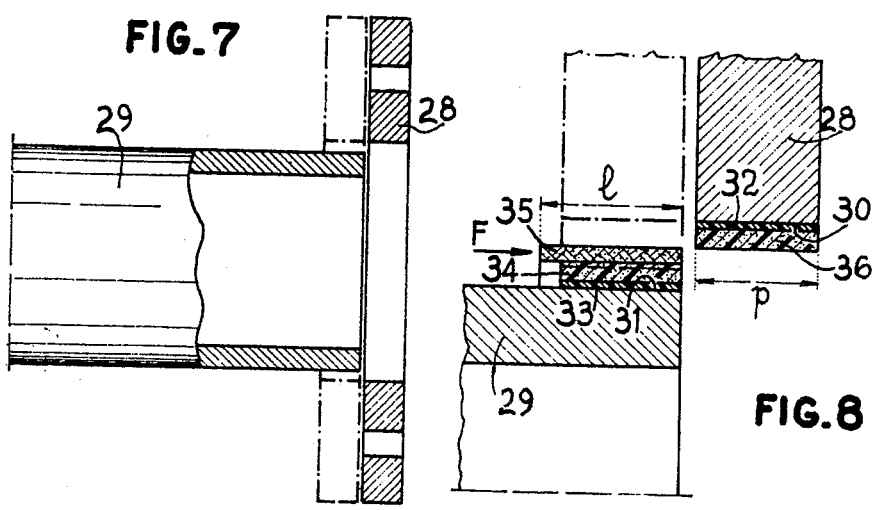

METHOD FOR ASSEMBLING BY ADHESION WITH SYNTHETIC RESINS

This is a continuation of application Ser. No. 426,733 filed Dec. 20, 1973 and now abandoned.

The present invention relates to a method for assembling by adhesion with synthetic resins.

It is known to make in high-pressure piping, joints by adhesion between pipes provided with a socket at one end and a male end or spigot at the other end. For this purpose, the annular space between the socket and the male end after introduction of the latter in the socket is filled with epoxy resin. The latter is cured at surrounding temperature or by an exterior application of heat. Such joints have excellent strength and a very good performance as regards chemical attack by the surrounding media.

However, this method has the following drawbacks:

Epoxy resins are expensive and the extent of the possible annular variations between the male or smooth end and the socket due to manufacturing tolerances very often results in a very high consumption of resin and this increases the costs. Moreover, the time required for the polymerization at surrounding temperature considerably delays the time when the pipe may be handled. On the other hand, if in order to remedy this drawback there is employed an exterior supply of heat, this, above all in the case of large-diameter pipes, is not easy to employ in the often precarious conditions of a pipe-laying site.

An object of the present invention is to remedy these and other drawbacks.

The invention provides a method for assembling comprising first applying on each of the confronting surfaces of the parts to be assembled a thin layer of a curable mixture of a first resin which cures slowly and is slightly exothermic and has a good adherence to the parts to be assembled, filling the space remaining between the layers with a curable mixture of a second resin which cures rapidly and is sufficiently exothermic to promote the curing of the first resin and normally has after curing a poor adherence to the parts to be assembled but a good adherence to the first resin.

In this way, advantage is taken of the heat liberated throughout the entire duration of its gelling and hardening, by the exothermic reaction of the curing of the second resin so as to accelerate the much slower reaction of the first resin whose exothermic liberation of heat is much less and limited practically to the gelling phase.

Particularly advantageously, the first resin is an epoxy resin and the second resin is a polyester resin. Moreover, the second resin is preferably employed with a filler.

It will be understood that although the invention has been made in the field of research for improving methods of assembling pipe elements by adhesion with adhesives based on thermosetting plastics material, it is however also applicable to other assemblies achieved by adhesion outside the field of piping. In the particular case of joints for iron pipes achieved by adhesion, joints are obtained which are both cheap and simple to produce and are rapidly ready for handling.

In its application to the assembly of a joint between the socket of a pipe and the male or smooth end of another pipe, the method according to the invention comprises, after application of layers of the first mixture, depositing a filler in a volume corresponding to the annular space defined by the layers of the first mixture in the final assembled state, and, after the filler has been deposited, injecting the second resin into the filler.

In its application to the assembly of a joint between two planar parts, the method according to the invention comprises, after application of layers of the first mixture, disposing a filler in a volume corresponding to the space defined by the layers of the first mixture in the final assembled state, and, after the filler has been deposited in the joint, injecting a second resin in the filler.

In its application to the anchoring of a metal body to the surface of a mass of concrete, the method according to the invention comprises, after application of layers of the first mixture to the surfaces of the metal body and mass of concrete adapted to be in confronting relation, maintaining the body in position with respect to the mass, placing a wall on the mass of concrete so as to define a recipient, and pouring the second mixture into said recipient.

In its application to the assembly of a joint of electric cables, the method according to the invention comprises, after application of layers of the first mixture to the surfaces of the electric cables and their connectors, disposing a mould around the assembly and pouring the second mixture into said mould.

In its application to the assembly of a flange on a pipe, the method according to the invention comprises, after application of layers of the first mixture to the surfaces of the flange and pipe adapted to be in confronting relation, applying on the layer on the pipe and over the same area as the layer, a thick layer of the second mixture, then placing on said thick layer by making it extend beyond the latter a winding of a reinforcing material impregnated with the second mixture, placing the flange in position on the pipe and compressing the winding in the annular space defined by the flange.

Particularly advantageously, there is employed, as the first curable mixture, a mixture of 50% of epoxy resin and 50% of hardener and, as second curable mixture, a mixture of 120 parts by weight of polyester resin, 150 parts of a granular filler, 2.4 parts of an accelerator and 3.6 parts of a catalyst.

Further features and advantages of the invention will be apparent from the ensuing description with reference to the accompanying drawings.

In the drawings:

FIG. 1 is an axial sectional view of an adhered joint achieved in accordance with the invention between two iron pipes having a socket and a male end;

FIG. 2 is a sectional view of an assembly according to the invention between two metal parts;

FIGS. 3 and 4 are sectional views, FIG. 4 being to an enlarged scale, of the anchoring of a metal body to a mass of concrete, FIG. 3 being before assembly and FIG. 4 after assembly;

FIGS. 5 and 6 are sectional views, FIG. 6 being to an enlarged scale, of the assembly of a joint of electric cables, and FIGS. 7 and 8 are sectional views, FIG. 8 being to an enlarged scale, of the assembly of a flange on a pipe.

The joint shown in FIG. 1 comprises a first pipe $T^1$ which has a socket E and a second pipe $T_2$ which has a smooth or male end introduced in the socket E.

Before assembly, the two surfaces of the socket and male end which must be in confronting relation in the final assembly are first prepared by the known techniques for the preparation of surfaces to be adhered or to be coated (brushing, sand blasting, etc..). There is then applied on each surface a thin film 1 or 2 of a curable epoxy resin base mixture containing all the additives necessary for the curing such as for example polyamides, this mixture being capable of polymerizing slowly at surrounding temperature or more rapidly upon application of heat. There is then applied on the thus coated male end of pipe $T^2$ a winding 3 of glass fibre felt, this winding having a thickness for filling the annular space between the male end and the socket after introduction of the male end in the latter. The thus coated male end is inserted in the socket E after having placed at the inner end of the socket an element 4 of suitable material such as rubber, plastics material or a plastic metal such as lead, this element being also applied against the axial wall of the socket and closing the annular space between the socket and the male end, the latter bearing axially against each element.

By way of a modification, after having deposited the films 2 and 3, the male end is first introduced into the socket and then the annular space remaining between the socket and the male end is filled with glass fibre.

In either case, there is then injected under pressure in the annular wad 3 of glass fibres a curable mixture containing polyester resin which cures rapidly. Note that this wad must have a certain density with respect to the amount of resin to be injected so as to limit the risk of splitting or cracking of the resin after its curing. The composition of the mixture is so chosen that it takes less than 5 minutes to start curing. The injection may be carried out by means of any commercially available machine which is capable of carrying out at the same time a suitable metering of the constituents of the mixture, namely the resin, the catalyst and the accelerator, before feeding them in two streams meeting at the point of an injecting nozzle, one stream comprising the resin and the accelerator and the other stream the catalyst or, preferably, one stream comprising resin and the accelerator and the other resin and the catalyst.

The curing of this polyester resin liberates a large amount of heat and terminates within a few minutes. The heat thus liberated is then sufficient to at least markedly initiate the curing of the films 1 and 2 of epoxy resin and thus fix the mass of glass fibre and polyester resin to the two surfaces between which this mass is disposed.

A piping assembled in this way can then be handled without risk within a few dozen minutes after injection of the polyester.

It should moreover be mentioned that in the example of the application described hereinbefore, an additional measure was taken to facilitate this handling without having to wait until total curing of the epoxy resin had occurred. The inner surface 5 of the socket is moulded at a rake so that it slightly converges toward the opening of the socket. Thus the cured mass of polyester filled with glass fibres constitutes with no need to wait until final hardening of the epoxy film has occurred, a wedge which interlocks the pipes against axial movement with respect to each other.

This method therefore enables a joint to be made between pipes alongside a trench and enables them to be laid in long pre-assembled sections. The final curing of the layers of epoxy providing the required adherence can then terminate at the surrounding temperature during a period of a few days.

The joint thus obtained has for other advantages a good electrical insulation, a good resistance to chemical and mechanical action of the fluids transported, affords homogeneous strength throughout the length of the piping and the possibility of making the joint at temperatures between $-10°$ C and $+50°$ C.

Moreover, for temperatures below $-10°$ C, the constituents of the polyester resin may be heated.

The assembly shown in FIG. 2 is achieved between two planar metal parts $p^1$ and $P^2$ in the same way as in the previously described example by application of epoxy resin, then application of a felt or packing of fibres, and then injection of polyester resin, an auxiliary member $4^1$ temporarily performing the function of the element 4 to close one end of the free space between the two parts.

Other embodiments may also be envisaged without departing from the scope of the invention.

Thus, for example, the felt of glass fibres may be pre-impregnated with one of the components of the polyester resin, preferably the catalyst, so as to limit the injection solely to the accelerator and the resin. This considerably simplifies the injecting apparatus and conditions.

There may also be employed, instead of a fibrous filler such as a felt of glass fibres 3, another filler of, for example, a granular nature such as sand, it being understood that in the case of FIG. 1 the male end of the pipe $T^2$ is inserted in th socket of the pipe $T^1$ before inserting this filler.

The invention may be carried out by employing as resin which has a rapid curing and is highly exothermic, many other thermosetting resins of composition which has been duly designed for hardening cold with liberation of heat, such as for example phenoplast resins or furanic resins catalysed with acids.

As concerns applications of the invention other than those mentioned hereinbefore, they are most diverse and there may also be mentioned by way of non-limitative examples, various assemblies such as the fixing of pre-stressing cables in reinforced concrete, the sealing of metal parts in anchorings in concrete, the joining of cable sheaths, the coating of the junction of electric cables, and the adhesion of pipe flanges.

In the three following applications use will be made of the same materials, namely, on one hand, polymerizable mixture containing a resin which cures slowly, is slightly exothermic, has a good adherence to the parts to be assembled, and will be termed the coating mixture, and, on the other hand, a second curable mixture containing a resin which cures rapidly, is sufficiently exothermic to promote the curing of the first resin, normally has a poor adherence to the parts to be assembled after curing. but a good adherence to the first resin, and will be termed the filling mixture.

The coating mixture comprises 50% by volume of an epoxy resin and 50% by volume of a hardener such as those constituting the mixture known under the trade name of Araldite under references AV100 and HV100, this mixture being produced by the firm SIBA-GEIGY. The two constituents of this mixture are intimately mixed just before its application.

The filling mixture is a mixture containing a polyester resin having low shrinkage. It comprises a mixture of respectively 100 and 20 parts by weight of two resins known under the commercial references BP 862 and L 3270 produced by the firm BIP CHEMICALS Ltd, and a filler constituted by 150 parts by weight of the product known under the commerical name of Garaquartz S12 produced by the firm PLASTICHEM Ltd. and a mixture of respectively 2.4 and 3.6 parts by weight of an accelerator and a catalyst, such as those known under the commercial references NL49ST and Butanox M 50 produced by the Company AKZO-CHEMIE.

In the application shown in FIGS. 3 and 4, a metal body, as a metal shoe 11 of a machine, must be assembled with a mass of concrete 12. The surface 13 of the concrete is first ground and the lower surface 14 of the shoe is sand blasted or cleaned with a metal brush so as to remove any surface deposit or corrosion. There are then applied to the surface 13 of the concrete and the surface 14 of the shoe two thin laters 15 and 16 of the aforementioned coating mixture. The shoe 11 is then brought to the position it must occupy with respect to the mass of concrete 12 and maintained temporarily in this position, for example by means of jacks or like devices, after having deposited along the surface 13 with which the shoe 11 must be assembled an annular retaining wall 17 of cardboard or light plastics material, as polystyrene. There is then poured into the recipient 8, constituted by the wall 17 and the surface 13 of the concrete, the aforementioned filling mixture in the required amount for filling at least the whole of the space between the surfaces of the layers 15 and 16. The solidification of the filling mixture 19 containing polyester resin then occurs within substantially 10 minutes after its application if the surrounding temperature is of the order of 20° C. In most cases it is then possible to put the shoe 11 under stress (by placing the frame of the machine on a group of similar shoes) within roughly one hour after the pouring of the filling mixture.

The advantages afforded in this application of the method to the anchoring of a metal body to a mass of concrete are among others, the following : A considerable cheapening with respect to the prior art in which there was effected an integral filling by means of solely the mixture containing epoxy resin, it being born in mind that in many cases several tons of the filling mixture had to be used in particular for large machines. A much more rapid setting than in the case of the use of epoxy resin alone or of cement mortar. The assembly achieved is much more durable and more resistant to attack by chemical products and oil as apposed to assemblies containing cement mortar, this duration and this resistance being moreover about the same as those of the assembly employing epoxy resin alone in the majority of the conditions of assembly and utilization.

It will be clear that the method may be applied in the same way to similar caes, such as the fixing of metal bodies in cavities formed in concrete, such as the anchoring of cable or foundation bolts in concrete.

In the application shown in FIGS. 5 and 6, a joint must be made between electric cables constituted by two cable ends whose sheaths 20 and 21 have been prepared in such manner as to bare the cable ends 22 and 23, the latter being interconnected in pairs by electric connectors 24. After having prepared the surfaces of the electric connectors, of the sheaths of the conductors and of the metal parts, which have been bared if need be, there are applied on these various elements thin layers 25 of the aforementioned coating mixture. The whole of the joint is then enclosed in a mould 16 which is of light plastics material constituted by two half-shells and has a suitable shape so that its end portions surround the sheaths 20 and 21 with interposition of windings of adhesive bands so as to seal these regions. There is then poured (as shown in dot-dash line in FIG. 5) the aforementioned filling mixture until the mould is completely filled. The poured filling material 27 sets within about 10 minutes at a temperature of 20° C and it is then possible to proceed almost immediately to the laying and positioning of the cable. In this case, the low shrinkage of the mixture containing polyester resin, which is approximately 1%, results in a very forceful clamping of the filling material onto the various element of the joint which is thus perfectly assembled within an extremely short time. In this way, a strong joint is obtained even before the epoxy resin has been completely hardened.

In the application shown in FIGS. 7 and 8, a flange 28 must be assembled on the cylindrical end portion 29 of a pipe. The surfaces 30 and 31 of the flange and pipe adapted to come into facing relation are first prepared by projection of metal shot or cleaned with a metal brush so as to remove deposits, surface corrosion or paint which may have been aplied to the parts. Thin layers 32 and 33 of the aforementioned coating material are then applied to the surfaces 30 and 31. A thick layer 34 of the aforementioned mixture containing polyester resin is then applied to the layer 33 which coats the end of the pipe, then windings of flexible terylene tape or braid 35 are applied and the latter is coated and impregnated with the same filling mixture containing polyester resin. The length 1 of the pipe covered with this winding must be, for a reason which will be understood hereinafter, greater than the axial length p of the opening of the flange. There is applied on the inner surface of the layer 32 of the flange a thick layer 36 of the mixture containing polyester resin, then the end of the pipe is introduced in the opening of the flange. The windings 35 of terylene tape or braid are then compressed inside the remaining small annular space either by hammering by means of a hammer or with any other suitable device producing a similar result. At a surrounding temperture of 20° C, the assembly obtained may be subjected to any other operation and may in particular be subjected to slight stresses. By way of a modification, there may be employed, instead of the flexible terylene tape or braid, a flexible tape or braid of glass fibre. It is to a certain extent advantageous to apply the coatings of the mixture containing epoxy resin a certain time before proceeding to final assembly. These coating have then partly set and have a reasonable hardness and can therefore resist the abrasion which occurs when the windings of tape of braid are compressed.

I claim:

1. A method for assembling two planar parts at surrounding temperature with no necessity to apply heat comprising applying on a surface of each the parts to be assembled a thin layer of a polymerizable first mixture at surrounding temperature and containing a first resin which polymerizes slowly at surrounding temperature and is slightly exothermic as it polymerizes and has a good adherence to said surfaces while allowing a space between said thin layers in the desired and final position of said parts, and thereafter introducing in said space between the layers, before the first resin has substantially polymerized, a polymerizable second mixture at surrounding temperature and containing a second resin which polymerizes more rapidly at surrounding temperature than said first resin and has a good adherence to the first resin and is sufficiently exothermic as it polymerizes to accelerate the polymerization of the first resin, said method including a step of adding a filler between the layers of said first mixture before said second mixture is introduced by injecting the second mixture in said filler and in said space.

2. A method as claimed in claim 1, wherein the filler is a fibrous filler and is applied on the layer of the first mixture which covers one of the parts before the two parts are placed in the desired final position with respect to each other.

3. A method as claimed in claim 1, wherein the filler is a fibrous filler and is packed in the space defined by the layers of the first mixture after the two parts have been placed in the desired position with respect to each other and an end of the space has been closed by sealing means.

4. A method as claimed in claim 1, comprising pre-impregnating the filler with a catalyst of the second mixture, an accelerator of the second mixture being injected at the same time as the resin.

5. A method as claimed in claim 1, comprising injecting a catalyst and an accelerator of the second mixture at the same time as the resin.

6. A method as claimed in claim 5, comprising injecting the second mixture in two streams, one stream being of resin and accelerator and the other stream being of catalyst.

7. A method as claimed in claim 5, comprising injecting the second mixture in two streams, one stream being of resin and accelerator and the other stream being of resin and catalyst.

8. A method for anchoring a metal body to a mass of concrete at surrounding temperature with no necessity to apply heat, comprising applying on a surface of the body and on a surface of the mass of concrete a thin layer of a polymerizable first mixture at surrounding temperature and containing a first resin which polymerizes slowly at surrounding temperature and is slightly exothermic as it polymerizes and has a good adherence to said surfaces while allowing a space between said layers in the desired final position of the body on the mass of concrete, placing and maintaining the body in the desired position relative to the mass of concrete, placing means defining a wall on the mass of concrete so as to define a reservoir with the thin layers of said first mixture, and thereafter pouring into the reservoir, before the first resin has appreciably polymerized, a polymerizable second mixture at surrounding temperature and containing a second resin which polymerizes more rapidly at surrounding temperature than said first resin and has a good adherence to the first resin and is sufficiently exothermic as it polymerizes to accelerate the polymerization of the first resin.

9. A method for assembling and bonding together two parts at surrounding temperature with no necessity to apply heat comprising applying on a surface of each of the parts to be assembled at surrounding temperatures a thin layer of a curable first composition containing a first resin which cures slowly at surrounding temperature and is slightly exothermic as it cures and has a good adherence to said surfaces, then assembling said two parts while allowing a space between said thin layers in the desired and final position of said parts, and thereafter introducing in said space between the layers at surrounding temperature, before the first composition has appreciably cured, a curable second composition containing a second resin which cures more rapidly at surrounding temperature than said first resin and has a good adherence to the first resin and is sufficiently exothermic as it cures to accelerate the curing of the first resin, thereby producing a resultant structure consisting of five separate layers all securely bonded together comprising a first of said two parts, a first cured layer resulting from curing of a first of said thin layers of curable first composition, a second cured layer resulting from curing of said curable second composition, a third cured layer resulting from curing of a second of said thin layers of curable first composition and a second of said two parts.

10. A method as claimed in claim 9, wherein the second resin is employed with a filler.

11. A method as claimed in claim 9, applied to the assembly of a joint of electric cables with connections, comprising, after application of layers of the first mixture on the surfaces of the electric cables and their connections, disposing a mould around the assembly and pouring into the mould the second mixture.

12. A method as claimed in claim 9, applied to the assembly of a flange on a pipe, comprising, after application of the layers of the first mixture on the surfaces of the flange and pipe which are intended to come into facing relation, applying on the layer of the first mixture which coats the pipe and on the same area as the last-mentioned layer a thick layer of the second mixture then, applying on the thick layer and making it extend beyond the thick layer, a layer of reinforcing material impregnated with the second mixture, placing the flange in position on the pipe, and compressing the layer of reinforcing material in the annular space defined by the flange.

13. A method as claimed in claim 9, comprising employing as the curable first composition a mixture of 50% of epoxy resin and 50% of hardener.

14. A method as claimed in claim 9, comprising employing as the curable second composition a mixture of 120 parts by weight of polyester resin, 150 parts of granulous filler, 2.4 parts of accelerator and 3.6 parts of catalyst.

15. A method for assembling and bonding together a socket of a first pipe with a male end of a second pipe at surrounding temperature with no necessity to apply heat, comprising applying on an inner surface of the socket and on an outer surface of the male end at surrounding temperature a thin layer of a curable first composition containing a first resin which cures slowly at surrounding temperature and is slightly exothermic as it cures and has a good adherence to said surfaces, said layers having such thickness as to define an annular space between the two layers when the male and is located in an substantially coaxial with the socket, inserting the male end in the socket, and thereafter introducing in said annular space at surrounding temperature before the first resin has appreciably cured, a second composition containing a second resin which cures more rapidly at surrounding temperature than said first resin and has a good adherence to the first resin and is sufficiently exothermic as it cures to accelerate the curing of the first resin.

16. A method as claimed in claim 15, comprising injecting a catalyst and an accelerator of the second mixture at the same time as the resin.

17. A method as claimed in claim 16, comprising injecting the second mixture in two streams, one stream being of resin and accelerator and the other stream being of catalyst.

18. A method as claimed in claim 16, comprising injecting the second mixture in two streams, one stream being of resin and accelerator and the other stream being of resin and catalyst.

19. A method for assembling and bonding together a socket of a first pipe with a male end of a second pipe at surrounding temperature with no necessity to apply heat, comprising applying on an inner surface of the socket and on an outer surface of the male end at surrounding temperature a thin layer of a curable first composition containing a first resin which cures slowly at surrounding temperature and is slightly exothermic as it cures and has a good adherence to said surfaces, said layers having such thickness as to define an annular space between the two layers when the male end is located in and substantially coaxial with the socket, inserting the male end in the socket, and thereafter introducing in said annular space at surrounding temperature, before the first resin has appreciably cured, a second composition containing a second resin which cures more rapidly at surrounding temperature than said first resin and has a good adherence to the first resin and is sufficiently exothermic as it cures to accelerate the curing of the first resin, said method including a step of adding a filler between the male end and socket before said second mixture is introduced by injecting said second mixture in said filler and in said annular space.

20. A method as claimed in claim 19, wherein a fibrous filler is employed.

21. A method as claimed in claim 19, wherein a granulous filler is employed.

22. A method for assembling and bonding together two parts one of which at least is metallic at surrounding temperature with no necessity to apply heat comprising applying on a surface of each of the parts to be assembled at surrounding temperature a thin layer of a curable first composition containing an epoxy resin which cures slowly at surrounding temperature and is slightly exothermic as it cures and has a good adherence to said surfaces, then assembling said two parts while allowing a space between said thin layers in the desired and final position of said parts, and thereafter introducing in said space between the layers at surrounding temperature, before the first resin has appreciably cured, a curable second composition containing a polyester resin which cures more rapidly at surrounding temperature than said epoxy resin and has a good adherence to the epoxy resin and is sufficiently exothermic as it cures to accelerate the curing of the epoxy resin, thereby producing a resultant structure consisting of five separate layers all securely bonded together comprising a first of said two parts, a first cured layer resulting from curing of a first of said thin layers of curable first composition, a second cured layer resulting from curing of said curable second composition, a third cured layer resulting from curing of a second of said thin layers of curable first composition and a second of said two parts.

23. A method as claimed in claim 22, wherein the other of said two parts is a metallic part.

* * * * *